April 15, 1930.  J. M. SAULS  1,754,696
FISHING TOOL
Filed Dec. 4, 1928
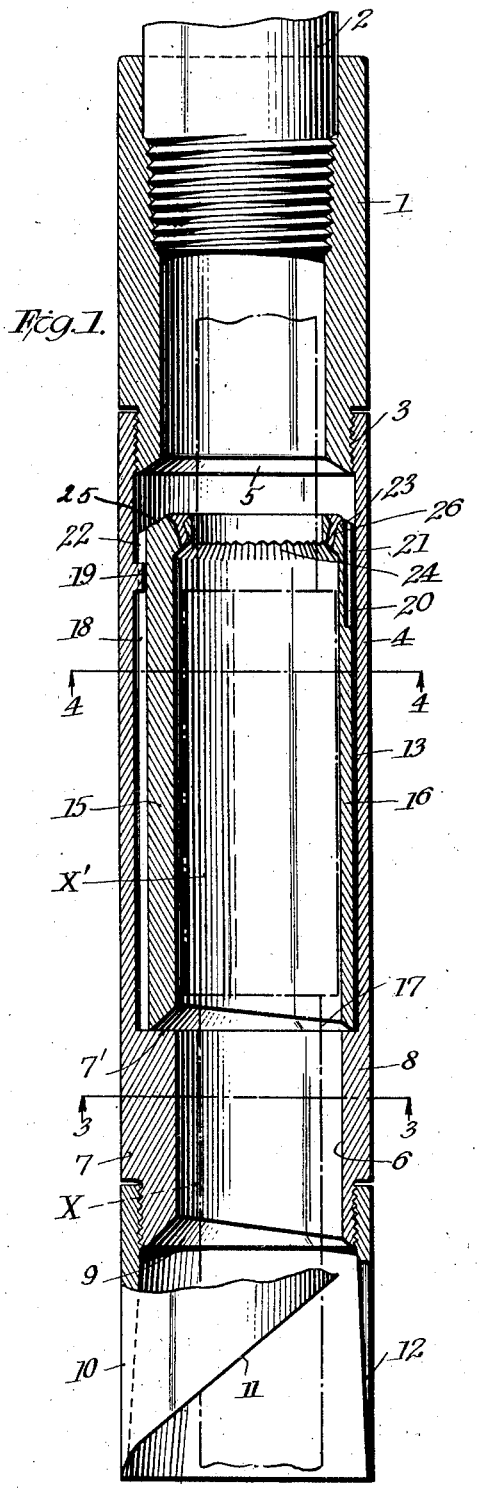
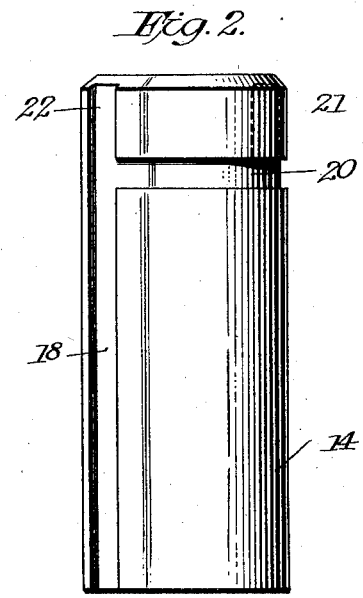
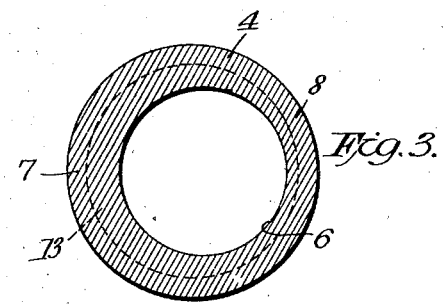
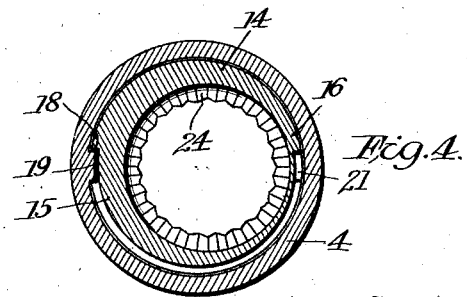
Inventor
John M. Sauls
By Eccleston & Eccleston,
Attorneys Patented Apr. 15, 1930

1,754,696

UNITED STATES PATENT OFFICE

JOHN M. SAULS, OF SEMINOLE, OKLAHOMA

FISHING TOOL

Application filed December 4, 1928. Serial No. 323,613.

The present invention relates to fishing tools and is in some respects an improvement on the invention disclosed in my co-pending application Serial No. 251,106, filed February 1, 1928. In that application a fishing tool is disclosed in which an eccentric barrel cooperates with an eccentric bushing for interlocking with a pipe joint or the like in fishing operations or in setting liners or the like in oil, gas and water wells.

An object of this invention resides in the provision of certain sealing effects by means of which the water pumped into the well may be caused to flow down through the "fish" and up about the outside thereof so as to free the broken pipe or the like in the event that the same has become "frozen" by reason of the caving in of the earth about the pipe.

A further object of the invention comprises various refinements in the operating parts of the mechanism by means of which the same is rendered more durable and of more general application than previous devices.

Other objects and advantages of the invention will be apparent from the following description when taken in connection with the accompanying drawing; in which Figure 1 is a vertical longitudinal section through the apparatus in assembled relation.

Figure 2 is a side elevational view of the bushing per se; and

Figures 3 and 4 are transverse sectional views taken on lines 3—3 and 4—4, respectively, of Figure 1.

More specifically, the numeral 1 indicates a coupling or joint by means of which the fishing tool is connected to a line of pipe 2. This element 1 is threaded at its lower end as indicated at 3 for connection with the barrel 4 and is also provided with an annular beveled lower end 5 for a purpose to be later described.

The barrel 4 is formed with an eccentric bore 6 in its lower portion providing a thick wall 7 on one side of the barrel and a thinner wall 8 on the opposite side; these walls merging into each other as indicated in Fig. 3. The lower end of the barrel 4 is beveled as indicated by numeral 9 so as to serve in guiding the broken pipe or the like into the interior of the tool. As an additional means for entering the "fish" into the tool a guide 10 is threaded onto the lower end of barrel 4 and is provided with a scalloped portion 11 and a sharp edge 12. This element serves, when the apparatus is being rotated, to engage over a "fish" which may be leaning over against the wall of the well cavity and direct it to the interior of the tool. Other types of guides, reamers, under reamers, and wall hooks may, of course, be substituted for the guide here shown if found desirable.

The upper portion of the barrel 4 is provided with a concentric bore 13 for the reception of an eccentric bushing 14 which is provided with a thick wall 15 and a thinner wall 16 merging into the wall 15. This bushing 14 is adapted to be rotated through an angle of 180° about its axis so that, due to its eccentricity, it will force a "fish" X over to the thicker side 7 of barrel 4, thereby causing the shoulder X' of the "fish" to overhang the upper edge 7' of wall 7. By this means it will be apparent that the article to be recovered from the well is interlocked with the tool and will so remain as long as the bushing 14 is retained with its thick wall 15 in juxtaposition with respect to the thin wall 8 of the barrel. The lower end of the bushing is beveled as indicated at 17 to serve as a guide for the entering pipe section.

For the purpose of maintaining the bushing 14 in either its locked or unlocked position its thicker wall is provided with a vertical slot 18 which cooperates with a lug 19 on the interior of barrel 4. This slot 18 communicates with a horizontal 20 which extends approximately 180° about the exterior wall of the bushing and terminates in two vertically extending slots 21 and 22, the latter being in alignment with slot 18. It will thus be seen that when the bushing is raised so as to bring lug 19 into alignment with slot 20 the bushing may be rotated 180° about its axis and that when lowered so as to bring the lug 19 into slot 21 or 22 the bushing is locked against rotation.

In order that the bushing may be rotated in the manner set forth when the tool is in a well, I have provided a shouldered or inturned portion 23 on its upper end which is provided with an annular series of teeth 24 adapted to bite into the material of the "fish" when the tool is lowered into position. By reason of this arrangement the "fish" holds the bushing stationary as the tool is lowered and thus brings the lug 19 into alignment with the horizontal slot 20 of the bushing. Excess relative movement between the lug 19 and bushing 14 is prevented by reason of the fact that the distance between the upper end of the bushing and the lower end of the coupling 1 is identical with the normal distance between lug 19 and slot 20. When the lug, therefore, is brought into alignment with slot 20 the pipe line 2 is given a one-half turn, and inasmuch as the bushing is held against rotation by reason of the teeth 24 cutting into the material of the "fish", the lug 19 is brought into alignment with slot 21. This movement of the parts brings the wall 15 of the bushing to a point diametrically opposed to the thick wall 7 of the barrel 4 and thus forces the "fish" over until its joint X' overhangs the shoulder 7' on the barrel. If the pipe 2 is now raised the lug 19 is carried up into the slot 21 and the parts are securely locked together until such time as they are unlocked at the surface of the ground or until the pipe 2 is released so as to allow the lug 19 to descend into alignment with slot 20 so that it may be rotated through 180° to again release the "fish"; such action usually taking place where it is found that the "fish" is so tightly stuck as to be incapable of withdrawal.

In the event that the lost tool or the like cannot be removed on the first trial, it is desirable to circulate water about the exterior of the tool for the purpose of loosening the same. To this end it is of importance that a seal be provided between the coupling 1 and bushing 14 in order that the water may be caused to flow downwardly through the fish X and upwardly about the outside thereof so as to remove the pressure of the caved-in earth from its walls. It is for this purpose that the bevel 5, heretofore mentioned, is employed. This bevel is adapted to cooperate with a similar bevel 25 on the upper end of bushing 14 so as to seal the joint between the coupling 1 and the bushing 14 which are brought into contacting relationship by releasing the pipe 2 when it is found that the element X cannot be readily withdrawn. The bevels 5 and 25 form in effect a ground joint between these parts. It is of course, also desirable to seal the space between the shoulder X' of the "fish" and the inturned portion 23 of the bushing. Accordingly, the spaces between the teeth 24 are more or less filled with soft lead or the like which extends into a plurality of openings 26 bored through the inturned portion 23. It will thus be apparent that a seal is formed between the part X' and the inturned portion 23 of bushing 14 just as soon as the teeth 24 are caused to bite into the part X' by the release of the pipe 2. The sealing surfaces 5 and 25 are preferably inclined as shown so as to avoid an accumulation of foreign matter which would otherwise tend to reduce the effectiveness of the seal between the bushing and the barrel.

The bushing 14 and the barrel 4 are made of sufficient length to accommodate long and short pipe collars, tool joints, and drilling collars, and it is to be particularly noted that the locking grooves or keyways 18, 19, 21 and 22 are all shallow grooves formed in the wall of the bushing, thereby avoiding any substantial weakening of the structure and providing a bushing which will not warp from heat or strain. Furthermore, by reason of this novel construction the tool may be made of smaller diameter than heretofore, thus enabling its use in smaller holes or cavities than has been possible in prior devices.

The several steps in the operation of the apparatus have been fully set forth in connection with the description of the mechanism, and only a very brief description of the operation need be repeated here. As the tool descends in the well the bushing 14 is locked in inoperative position as shown in Fig. 1. The "fish" when encountered will be directed into the interior of the tool by reason of the guide 10 and the beveled ends 9 and 17 of the barrel and bushing respectively. As the coupling X' engages the inturned portion 23 of the bushing it prevents its further descent, thus causing the lug 19 to be brought into alignment with slot 20. The barrel 4 is now turned so as to bring its wall 7 into opposed relation with the wall 15 of bushing 14, thus forcing the "fish" X to one side of the tool and interlocking it with shoulder 7' on the barrel 4. The tool is now raised so as to bring lug 19 into the locking groove 21, and the "fish" withdrawn from the well without fear of disengagement from the tool. Should the fish be stuck too tight for withdrawal, the pipe 2 is lowered so as to seal the joints between the bushing 14 and coupling 1, and between the fish X and bushing, so as to cause the water pumped into the well to descend through the fish and travel upwardly on its exterior so as to remove the pressure of the cave-in or the like, so as to permit its withdrawal when an attempt is again made to raise the pipe 2. The appearance of the water at the top of the well is an indication to the operator that the "fish" has been cleared and is ready for removal. If after repeated trials it is found that the "fish" cannot be removed, it is only necessary that the pipe 2 be lowered the necessary distance to bring lug 19 into alignment with slot 20, and rotated through 180° to the position shown in Figure 1, thereby releasing the "fish" and allowing the tool to be raised to the surface.

From the foregoing description it will be apparent that the present fishing tool is an extremely simple one, that it is strong and durable in operation, and is of such dimensions as to permit its use with various types of "fish." It will also be noted that the device provides an excellent seal to facilitate the circulation of water about a frozen fish and that it is capable by reason of its small diameter to enter well cavities of the smaller type.

In accordance with the patent statutes I have described what I believe to be the best embodiment of the invention, but inasmuch as various minor changes may be made in the details of construction without departing from the spirit of the invention, it is intended that all such changes be included within the scope of the appended claims.

What I claim as new and desire to secure by Letters Patent is:

1. A fishing tool including a barrel, means associated with the barrel whereby the latter may be rotated to engage a "fish", means for locking said barrel and its associated means against relative movement, and means for forming a seal between the barrel and "fish".

2. A fishing tool including an eccentrically bored barrel, an eccentrically bored bushing disposed in substantial alignment with said barrel, said barrel and bushing being relatively rotatable, and means for forming a seal between the bushing and a "fish".

3. A fishing tool including a barrel, means associated with the barrel whereby the latter may be rotated to engage a "fish", means for locking said barrel and its associated means against relative movement, means for forming a seal betwen the barrel and "fish", and means for forming a seal between the barrel and bushing.

4. A fishing tool including an eccentrically bored barrel, a bushing disposed in substantial alignment with said barrel, said barrel and bushing being relatively rotatable to engage or disengage a "fish," and means for forming a seal between the "fish" and barrel, whereby water may be circulated downwardly through the "fish" and upwardly about the exterior thereof.

5. A fishing tool including an eccentrically bored barrel, an eccentrically bored bushing, said barrel and bushing being relatively rotatable, means for locking said barrel and bushing against relative rotation, and means for forming a seal between said barrel and bushing.

6. A fishing tool including an eccentrically bored barrel, an eccentrically bored bushing longitudinally slidable in said barrel and rotatable with respect thereto, and means for forming a seal between said barrel and bushing.

7. A fishing tool including an eccentrically bored barrel, an eccentrically bored bushing longitudinally slidable in said barrel and rotatable with respect thereto, means for locking said barrel and bushing against a relative rotatable movement, and means for forming a seal between said barrel and bushing.

8. A fishing tool including an eccentrically bored barrel, an eccentrically bored bushing rotatable through an arc of 180° with respect to said barrel, means for locking said bushing at either extreme of its rotative movement, and means for forming a seal between the barrel and bushing.

9. A fishing tool including an eccentrically bored barrel, an eccentrically bored bushing rotatable with respect to said barrel and provided with shallow keyways on its outer surface, and an inwardly projecting lug on said barrel for cooperation with said keyways.

10. A fishing tool including an eccentrically bored barrel, an eccentrically bored bushing rotatable with respect to said barrel and provided with vertical and horizontal keyways on its outer surface, and an inwardly projecting lug on said barrel for cooperation with said keyways.

11. A fishing tool including an eccentrically bored barrel, an eccentrically bored bushing rotatable with respect to said barrel and provided with vertical and horizontal keyways, a lug on said barrel for cooperation with said keyways, and means on said bushing for engaging a "fish."

12. A fishing tool including an eccentrically bored barrel, an eccentrically bored bushing rotatable with respect to said barrel and provided with vertical and horizontal keyways, a lug on said barrel for cooperation with said keyways, a shoulder on the upper end of said bushing, and teeth formed on said shoulder to firmly engage a "fish."

JNO. M. SAULS.